United States Patent
Hwang et al.

(10) Patent No.: US 10,291,377 B2
(45) Date of Patent: May 14, 2019

(54) METHOD AND TERMINAL FOR TRANSMITTING SOUNDING REFERENCE SIGNAL IN WIRELESS COMMUNICATION SYSTEM

(71) Applicant: LG ELECTRONICS INC., Seoul (KR)

(72) Inventors: Daesung Hwang, Seoul (KR); Joonkui Ahn, Seoul (KR); Kijun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/304,445

(22) PCT Filed: Apr. 17, 2015

(86) PCT No.: PCT/KR2015/003883
§ 371 (c)(1),
(2) Date: Oct. 14, 2016

(87) PCT Pub. No.: WO2015/163645
PCT Pub. Date: Oct. 29, 2015

(65) Prior Publication Data
US 2017/0033908 A1 Feb. 2, 2017

Related U.S. Application Data

(60) Provisional application No. 61/981,847, filed on Apr. 20, 2014.

(51) Int. Cl.
*H04L 5/00* (2006.01)
*H04L 27/26* (2006.01)
*H04W 72/04* (2009.01)

(52) U.S. Cl.
CPC ........... *H04L 5/0051* (2013.01); *H04L 5/00* (2013.01); *H04L 5/0016* (2013.01);
(Continued)

(58) Field of Classification Search
CPC ..................... H04L 15/0051; H04L 15/00
(Continued)

(56) References Cited

U.S. PATENT DOCUMENTS

2011/0164489 A1* 7/2011 Papasakellariou ............ H04W 72/0413
370/203
2011/0243066 A1* 10/2011 Nayeb Nazar .......... H04L 1/007
370/328

(Continued)

FOREIGN PATENT DOCUMENTS

| CN | 101330321 A | 12/2008 |
|---|---|---|
| CN | 101827444 A | 9/2010 |

(Continued)

OTHER PUBLICATIONS

New Postcom, "Uplink control signaling in CoMP scenario", R1-122089, 3GPP TSG RAN WG1 Meeting #69, Prague, Czech Republic, May 21, 2012-May 25, 2012, pp. 1-6.

(Continued)

*Primary Examiner* — Peter G Solinsky
(74) *Attorney, Agent, or Firm* — Birch, Stewart, Kolasch & Birch, LLP

(57) ABSTRACT

A disclosure of the present specification provides a method for transmitting a sounding reference signal (SRS) by a terminal. The method may include the steps of: receiving an SRS configuration from a base station by the terminal; on the basis of the received SRS configuration, determining an SRS sub-frame to which an SRS is to be transmitted among a plurality of sub-frames, and an SRS transmission region to (Continued)

which an SRS is to be transmitted in a physical uplink control channel (PUCCH) region on the SRS sub-frame; and transmitting the SRS to the SRS transmission region on the determined SRS sub-frame, wherein when the SRS and a PUCCH are transmitted simultaneously to the SRS transmission region, the SRS and the PUCCH may be multiplexed on the basis of code division multiplexing (CDM).

12 Claims, 15 Drawing Sheets

(52) U.S. Cl.
CPC ....... *H04L 27/2613* (2013.01); *H04W 72/042* (2013.01); *H04W 72/0413* (2013.01)
(58) Field of Classification Search
USPC .......................................................... 370/329
See application file for complete search history.

(56) References Cited

U.S. PATENT DOCUMENTS

| | | | | |
|---|---|---|---|---|
| 2012/0014349 | A1* | 1/2012 | Chung | H04B 7/0684 370/329 |
| 2012/0063426 | A1* | 3/2012 | Noh | H04L 5/0048 370/336 |
| 2013/0028134 | A1* | 1/2013 | Wang | H04L 5/0048 370/254 |
| 2013/0044692 | A1* | 2/2013 | Nory | H04L 5/0048 370/329 |
| 2014/0010182 | A1* | 1/2014 | Chunli | H04L 5/0048 370/329 |
| 2014/0328329 | A1* | 11/2014 | Novlan | H04W 72/042 370/336 |
| 2015/0195063 | A1 | 7/2015 | Ro et al. | |
| 2016/0014753 | A1* | 1/2016 | Wu | H04B 7/022 370/280 |

FOREIGN PATENT DOCUMENTS

| | | |
|---|---|---|
| CN | 102362441 A | 2/2012 |
| CN | 102461015 A | 5/2012 |
| CN | 102754373 A | 10/2012 |
| EP | 2634939 A2 | 9/2013 |
| WO | WO 2013/117231 A1 | 8/2013 |
| WO | WO 2014/035180 A1 | 3/2014 |

OTHER PUBLICATIONS

Pantech, "The aperiodic sounding using non-precoded DMRS", R1-112289, 3GPP TSG RAN1 Meeting #66, Athens, Greece, Aug. 22, 2011-Aug. 26, 2011, pp. 1-4.

* cited by examiner

METHOD AND TERMINAL FOR TRANSMITTING SOUNDING REFERENCE SIGNAL IN WIRELESS COMMUNICATION SYSTEM

CROSS REFERENCE TO RELATED APPLICATIONS

This application is the National Phase of PCT International Application No. PCT/KR2015/003883, filed on Apr. 17, 2015, which claims priority under 35 U.S.C. 119(e) to U.S. Provisional Application No. 61/981,847, filed on Apr. 20, 2014, all of which are hereby expressly incorporated by reference into the present application.

BACKGROUND OF THE INVENTION

Field of the Invention

The present invention relates to mobile communication.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

In a wireless communication system, an uplink channel or a downlink channel needs to be estimated for transmission/reception of data, system synchronization acquisition, channel information feedback, and the like. In a wireless communication system environment, fading occurs due to a multi-path time delay. A process of restoring a transmission signal by compensating distortion of a signal, which occurs by a rapid environmental change due to the fading is referred to channel estimation. Further, a channel state for a cell to which a terminal belongs or another cell needs to be measured. For the channel estimation or measuring the channel state, the channel estimation is generally performed by using a reference signal (RS) which a transmitter and a receiver mutually know.

An uplink reference signal may be divided into a demodulation reference signal (DMRS) and a sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received SRS and uses the estimated uplink channel in the uplink scheduling. The SRS may be periodically transmitted or when the base station needs to transmit the SRS, the SRS is triggered by the base station to be aperiodically transmitted.

Meanwhile, in a system in the related art, the sounding reference signal is not generally transmitted on a transmission region (alternatively, a resource region for the PUCCH) for the PUCCH.

However, a situation may be considered, in which the PUCCH is transmitted in a secondary cell (SCell) for the purpose of offloading for the PUCCH even with respect to a cell or a cell group having the same geographical position in a next system.

Accordingly, a transmission method of the sounding reference signal through a PUCCH region may be required for more efficient uplink scheduling.

SUMMARY OF THE INVENTION

Accordingly, the disclosure of the specification has been made in an effort to solve the problem.

In one aspect, a method for transmitting a sound reference signal (SRS) in a wireless communication system is provided. The method may be performed by a terminal and may include: receiving, by the terminal an SRS configuration from a base station; determining an SRS subframe on which the SRS is to be transmitted among a plurality of subframes and an SRS transmission region on which the SRS is to be transmitted in a physical uplink control channel (PUCCH) region on the SRS subframe, on the basis of the received SRS configuration; and transmitting the SRS in the SRS transmission region on the determined SRS subframe, wherein when the SRS and a PUCCH are simultaneously transmitted in the SRS transmission region, the SRS and the PUCCH may be multiplexed on the basis of code division multiplexing (CDM).

The multiplexing may be based on an orthogonal cover code (OCC).

Further, the SRS subframe may include two slots including a plurality of orthogonal frequency division multiplexing (OFDM) symbols, and the SRS may be transmitted in the last OFDM symbol of each of the two slots.

In addition, the SRS may be transmitted to be symmetric based on the center of an uplink bandwidth.

Moreover, the SRS subframe may include two slots including the plurality of orthogonal frequency division multiplexing (OFDM) symbols, and the SRS may be transmitted in any one OFDM symbol of each of the two slots.

Besides, the any one OFDM symbol may be designated in the SRS configuration or predesignated according to a radio network temporary identifier (RNTI) of the terminal.

Further, the SRS subframe may include two slots including the plurality of orthogonal frequency division multiplexing (OFDM) symbols, and the SRS may be transmitted in OFDM symbols corresponding to all or some of DMRSs among the plurality of OFDM symbols.

In addition, the SRS may be transmitted based on PUCC format 3.

Moreover, the SRS may be transmitted onto a PUCCH resource allocated based on a UL grant.

In another aspect, a terminal for transmitting a sound reference signal (SRS) in a wireless communication system is provided. The terminal may include: an RF unit configured to receive an SRS configuration from a base station; and a processor configured to control the RF unit to determine an SRS subframe on which the SRS is to be transmitted among a plurality of subframes and an SRS transmission region on which the SRS is to be transmitted in a physical uplink control channel (PUCCH) region on the SRS subframe, on the basis of the received SRS configuration and transmit the SRS in the SRS transmission region on the determined SRS subframe, wherein when the SRS and a PUCCH are simultaneously transmitted in the SRS transmission region, the SRS and the PUCCH may be multiplexed on the basis of code division multiplexing (CDM).

According to a disclosure of the present specification, the problem in the related art is solved. In more detail, according to the disclosure of the present specification, efficient transmission of a sounding reference signal through a PUCCH region is enabled.

DESCRIPTION OF EXEMPLARY EMBODIMENTS

Figure 1:
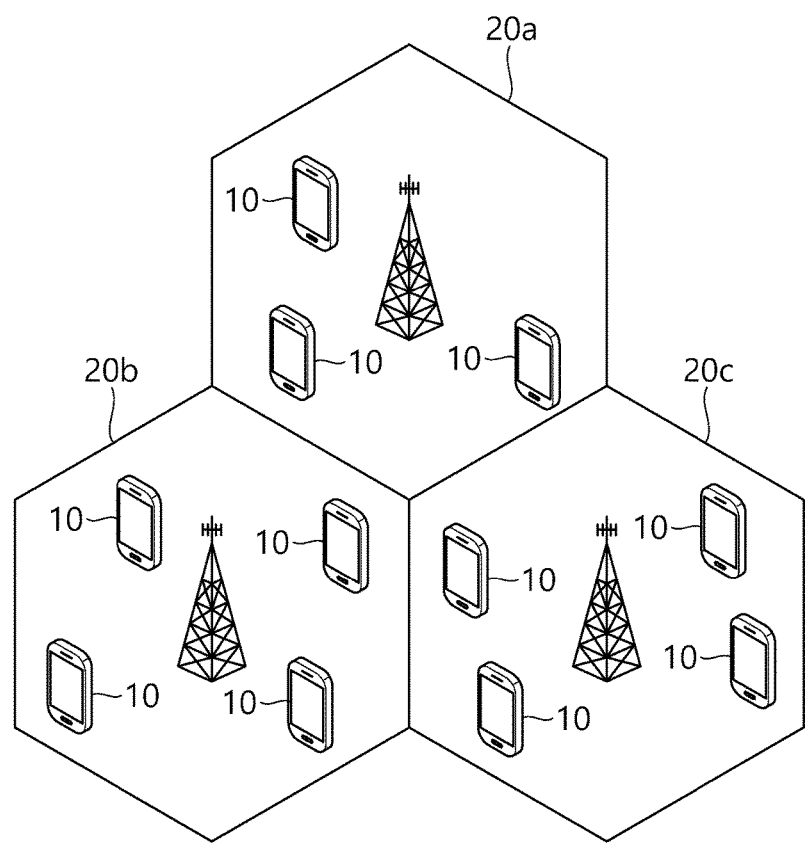
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEI 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which uplink transmission and the downlink transmission are divided by the unit of a subframe, the uplink transmission and the downlink transmission are performed in different subframes.

Hereinafter, the LTE system will be described in detail.

Figure 2:
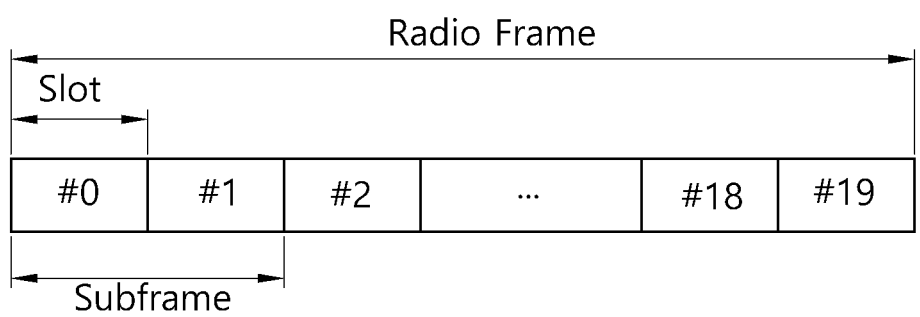
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
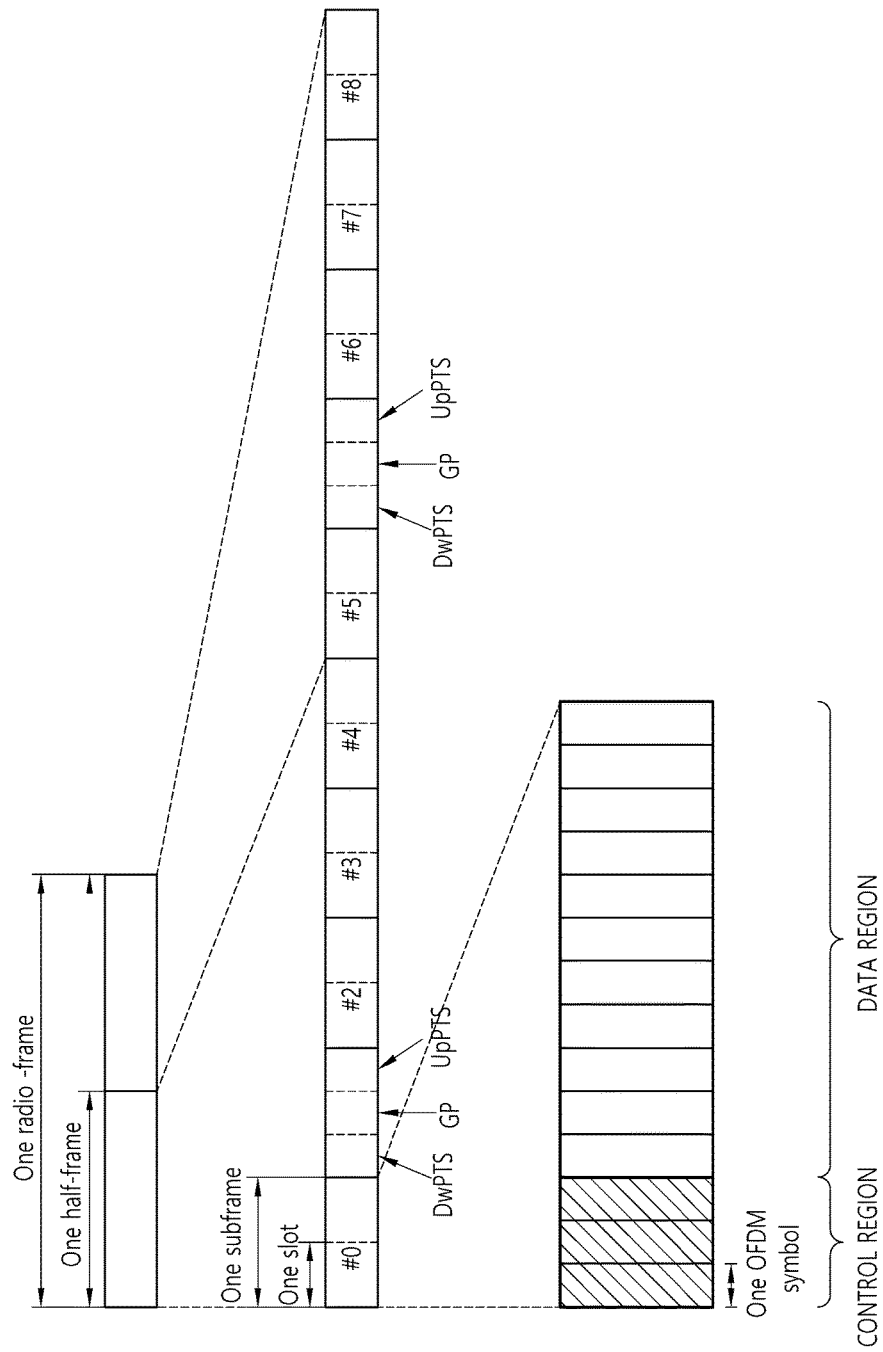
FIG. 3 illustrates a structure of a downlink radio frame according to time division duplex (TDD) in 3GPP LTE.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
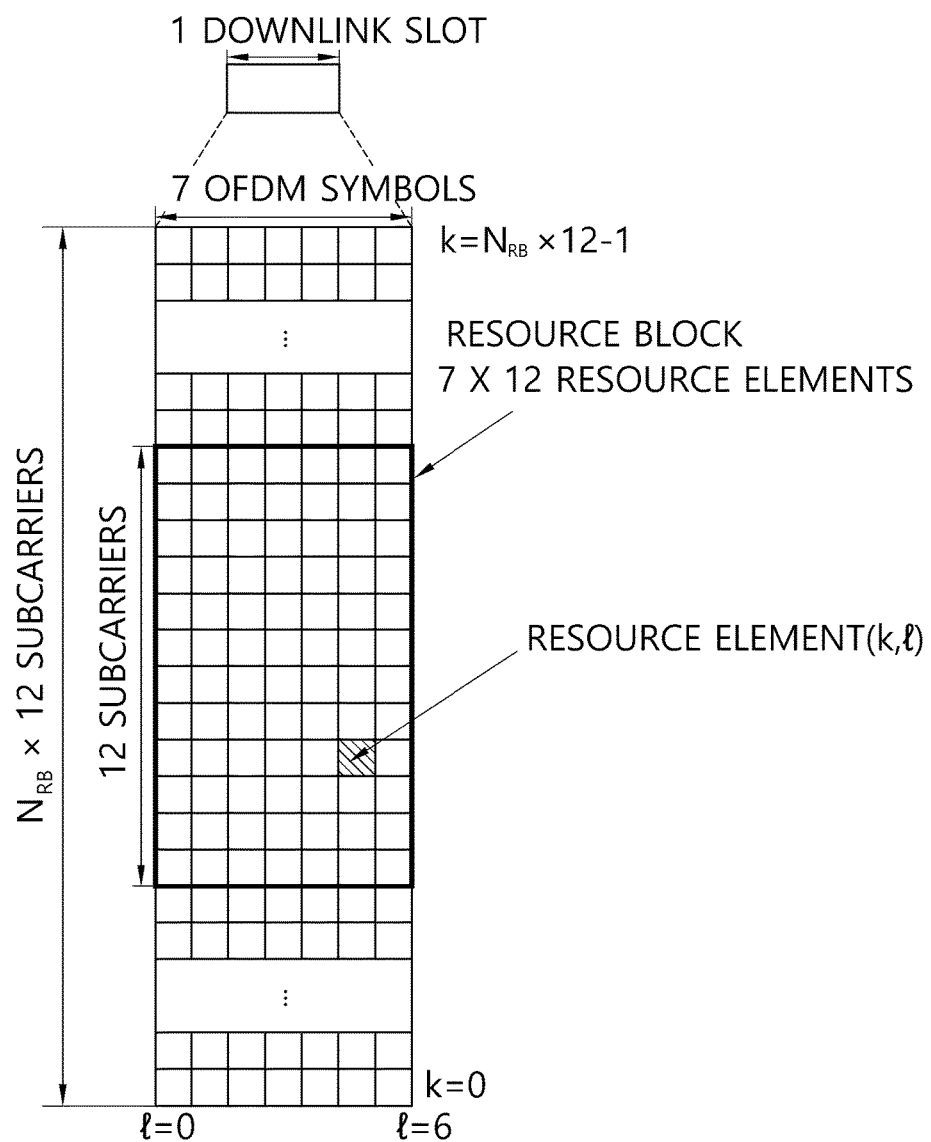
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
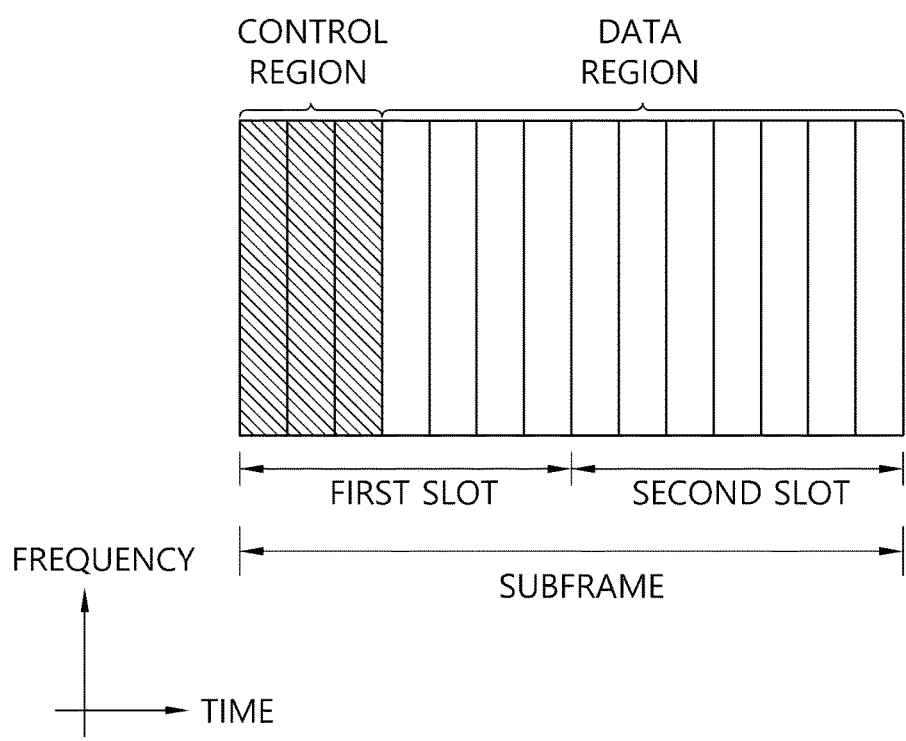
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a mode of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
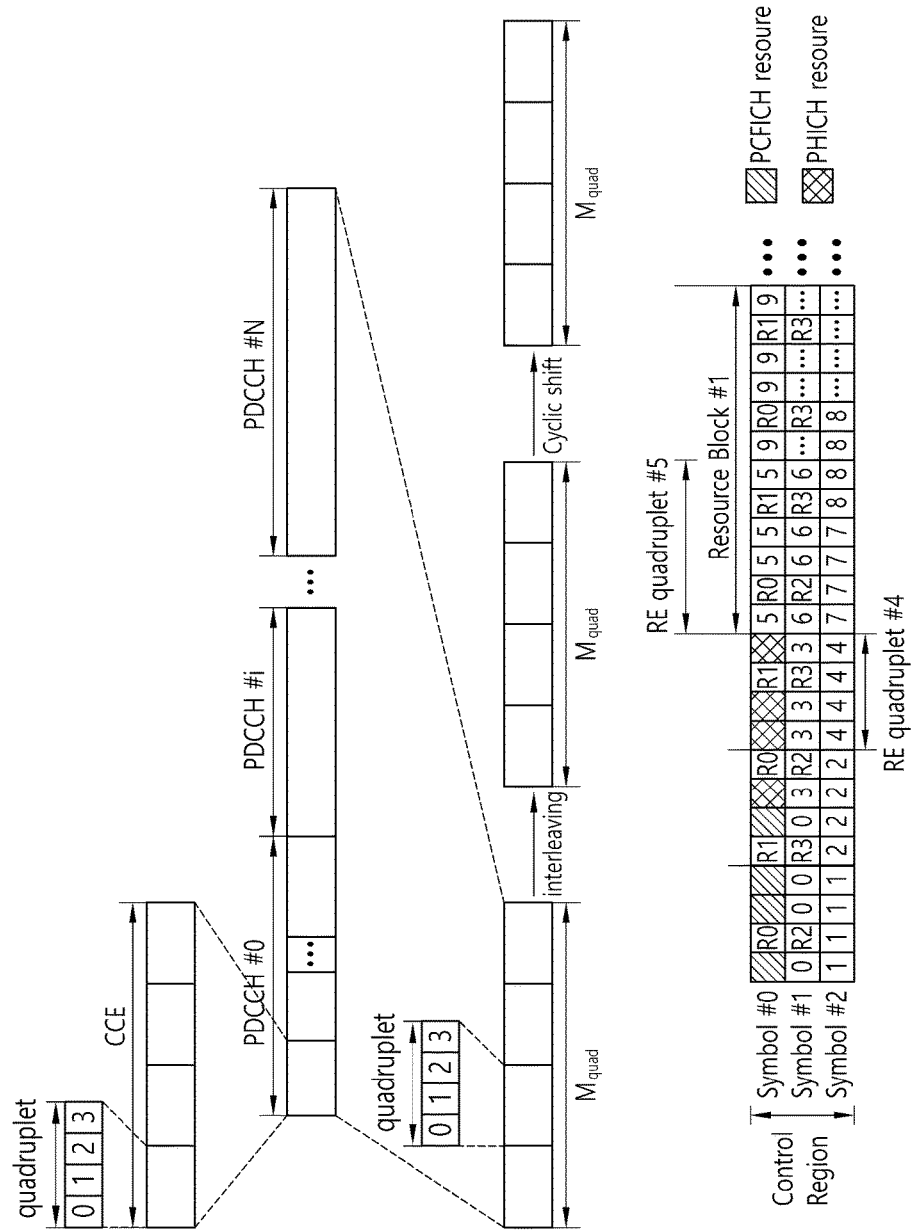
FIG. 6 illustrates an example of resource mapping of a PDCCH.

FIG. 6 illustrates an example of resource mapping of a PDCCH.

R0 denotes a reference signal of a $1^{st}$ antenna, R1 denotes a reference signal of a $2^{nd}$ antenna, R2 denotes a reference signal of a $3^{rd}$ antenna, and R3 denotes a reference signal of a $4^{th}$ antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

ABS determines the number of CCEs used in transmission of the PDCCH according to a channel state. For example, a UE having a good DL channel state may use one CCE in PDCCH transmission. A UE having a poor DL channel state may use 8 CCEs in PDCCH transmission.

One REG (indicated by a quadruplet in the drawing) includes 4 REs. One CCE includes 9 REGs. The number of CCEs used to configure one PDCCH may be selected from $\{1, 2, 4, 8\}$. Each element of $\{1, 2, 4, 8\}$ is referred to as a CCE aggregation level.

A control channel consisting of one or more CCEs performs interleaving in unit of REQ and is mapped to a physical resource after performing cyclic shift based on a cell identifier (ID).

Figure 7:
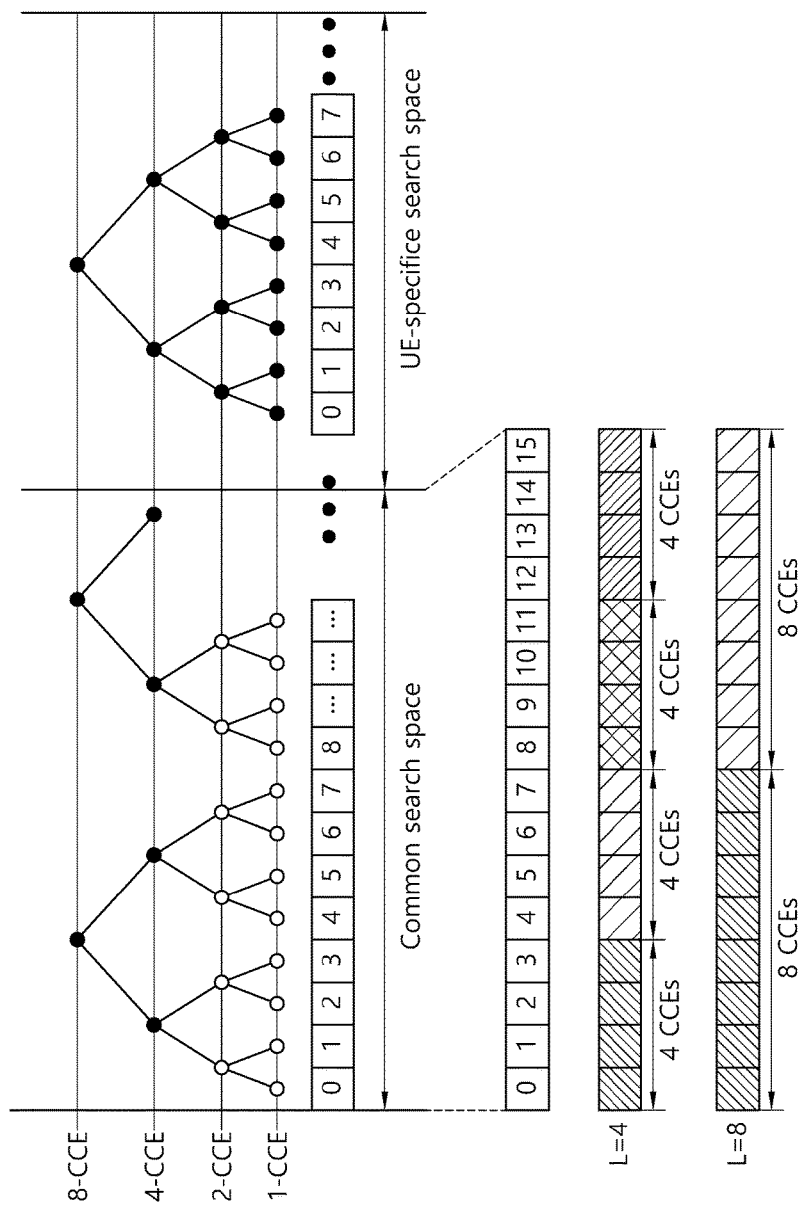
FIG. 7 illustrates an example of monitoring of a PDCCH.

FIG. 7 illustrates an example of monitoring of a PDCCH.

A UE cannot know about a specific position in a control region in which its PDCCH is transmitted and about a specific CCE aggregation or DCI format used for transmission. A plurality of PDCCHs can be transmitted in one subframe, and thus the UE monitors the plurality of PDCCHs in every subframe. Herein, monitoring is an operation of attempting PDCCH decoding by the UE according to a PDCCH format.

The 3GPP LIE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of $\{1, 2, 4, 8\}$.

Table 2 below shows the number of PDCCH candidates monitored by a wireless device.

TABLE 2

| Type | Search space $S^{(L)}_k$ | | Number $M^{(L)}$ of PDCCH candidates |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space $S^{(L)}_k$ is defined as a set of PDCCH candidates. A CCE corresponding to a PDCCH candidate m of the search space $S^{(L)}_k$ is given by Equation 1 below.

$$L\{(Y_k+m') \bmod \lfloor N_{CCE,k}/L \rfloor\}+i \qquad \text{[Equation 1]}$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of PDCCH candidates in a CCE aggregation level L of a given search space.

If a carrier indicator field (CIF) is configured for the wireless device, $m'=m+M^{(L)}n_{cif}$. Herein, $n_{cif}$ is a value of the CIF. If the CIF is not configured for the wireless device, $m'=m$.

In a common search space, $Y_k$ is set to 0 with respect to two aggregation levels L=4 and L=8.

In a UE-specific search space of the aggregation level L, a variable $Y_k$ is defined by below.

$$Y_k=(A \cdot Y_{k-1}) \bmod D \qquad \text{[Equation 2]}$$

Herein, $Y_{-1}=n_{RNTI} \neq 0$, A=39827, D=65537, k=floor($n_s/2$), and $n_s$ denotes a slot number in a radio frame.

When the UE monitors the PDCCH by using the C-RNTI, a search space and a DCI format used in monitoring are determined according to a transmission mode of the PDSCH.

Meanwhile, when the UE monitors the PDCCH by using the C-RNTI, a search space and a DCI format used in monitoring are determined according to a transmission mode (TM) of the PDSCH. Table 3 below shows an example of PDCCH monitoring for which the C-RNTI is configured.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and teiminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 8:
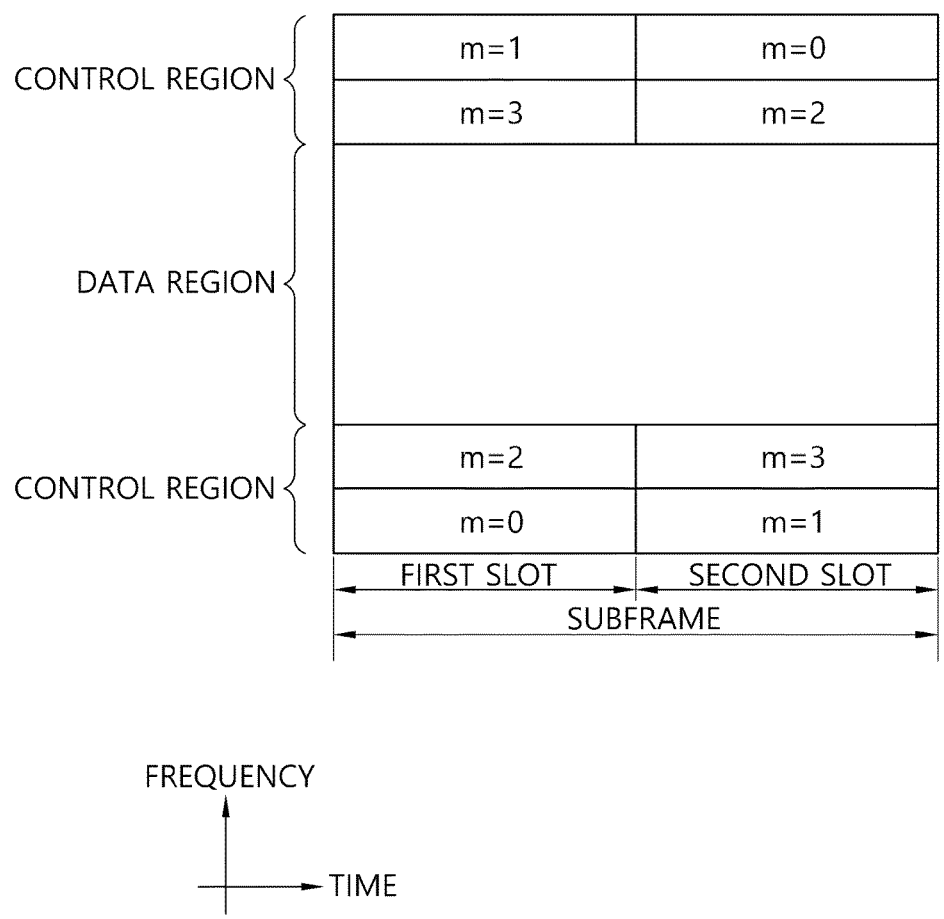
FIG. 8 illustrates the architecture of a UL sub-frame in 3GPP LTE.

FIG. 8 illustrates the architecture of a UL sub-frame in 3GPP LTE.

Referring to FIG. 8, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 9:
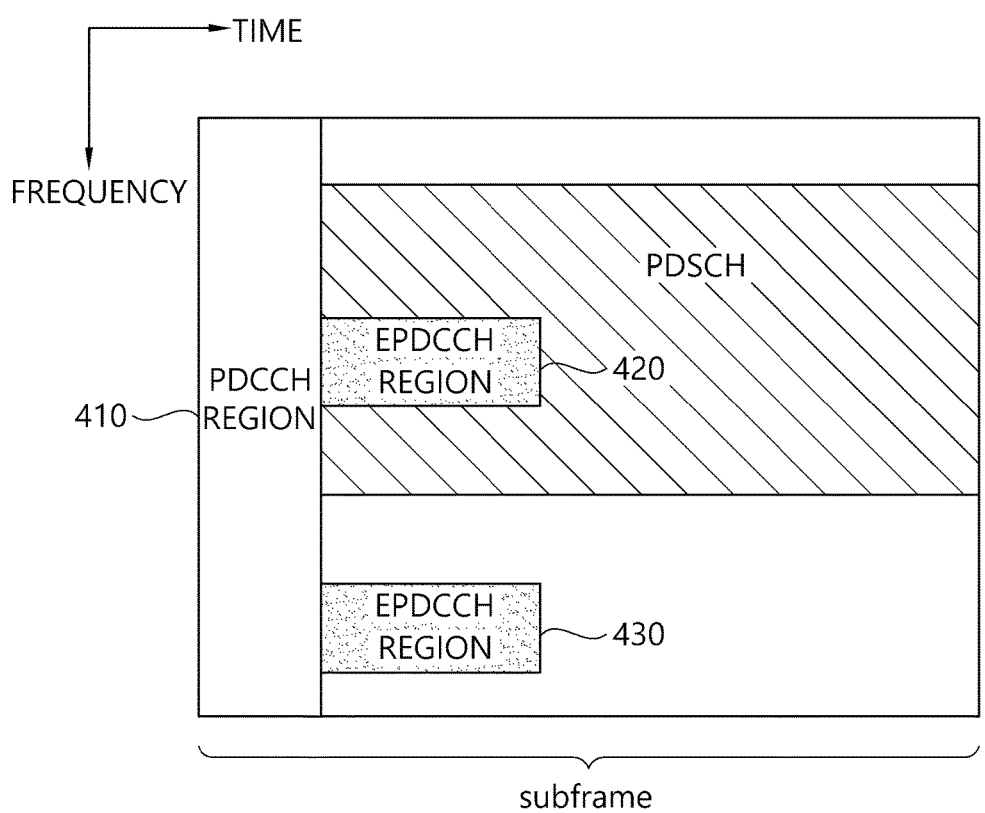
FIG. 9 illustrates a subframe having an EPDCCH.

FIG. 9 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

An RS sequence $r_{ns}(m)$ for the associated DM RS is represented by Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Here, m=0, 1, . . . , $2N_{maxRB}-1$, $N_{maxRB}$ denotes the maximum number of RBs, ns denotes the number of a slot in a radio frame, and l denotes the number of an OFDM symbol in a slot.

A pseudo-random sequence c(i) is defined by the following gold sequence with a length of 31.

Here, m=0, 1, . . . , $12N_{RB}-1$, and $N_{RB}$ denotes the maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ in each starting subframe. ns is the number of a slot in a radio frame, $N_{EPDCCH,ID}$ is a value associated with an EPDCCH set, which is given through a higher-layer signal, and $n_{EPDCCH,SCID}$ is a specific value.

The EPDCCH regions 420 and 430 may be used for scheduling for different cells, respectively. For example, an EPDCCH in the EPDCCH region 420 may carry scheduling information for a primary cell, and an EPDCCH in the EPDCCH region 430 may carry scheduling information for a secondary cell.

When EPDCCHs are transmitted in the EPDCCH regions 420 and 430 through multiple antennas, the same precoding as for the EPDCCHs may be applied to DM RSs in the EPDCCH regions 420 and 430.

Comparing with a CCE used as a transmission resource unit for a PDCCH, a transmission resource unit for an EPDCCH is an enhanced control channel element (ECCE). An aggregation level may be defined as a resource unit for monitoring an EPDCCH. For example, defining one ECCE as a minimum resource for an EPDCCH, an aggregation level may be defined as L={1, 2, 4, 8, 16}.

Hereinafter, an EPDCCH search space may correspond to an EPDCCH region. In an EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs according to a subframe type based on a TDD DL-UL configuration and a CP. For example, an ECCE may include four EREGs in a normal CP, while an ECCE may include eight EREGs in an extended CP.

A physical resource block (PRB) pair refers to two PRBs having the same RB number in one subframe. A PRB pair refers to a first PRB of a first slot and a second PRB of a second slot in the same frequency domain. In a normal CP, a PRB pair includes 12 subcarriers and 14 OFDM symbols and thus includes 168 REs.

Figure 10:
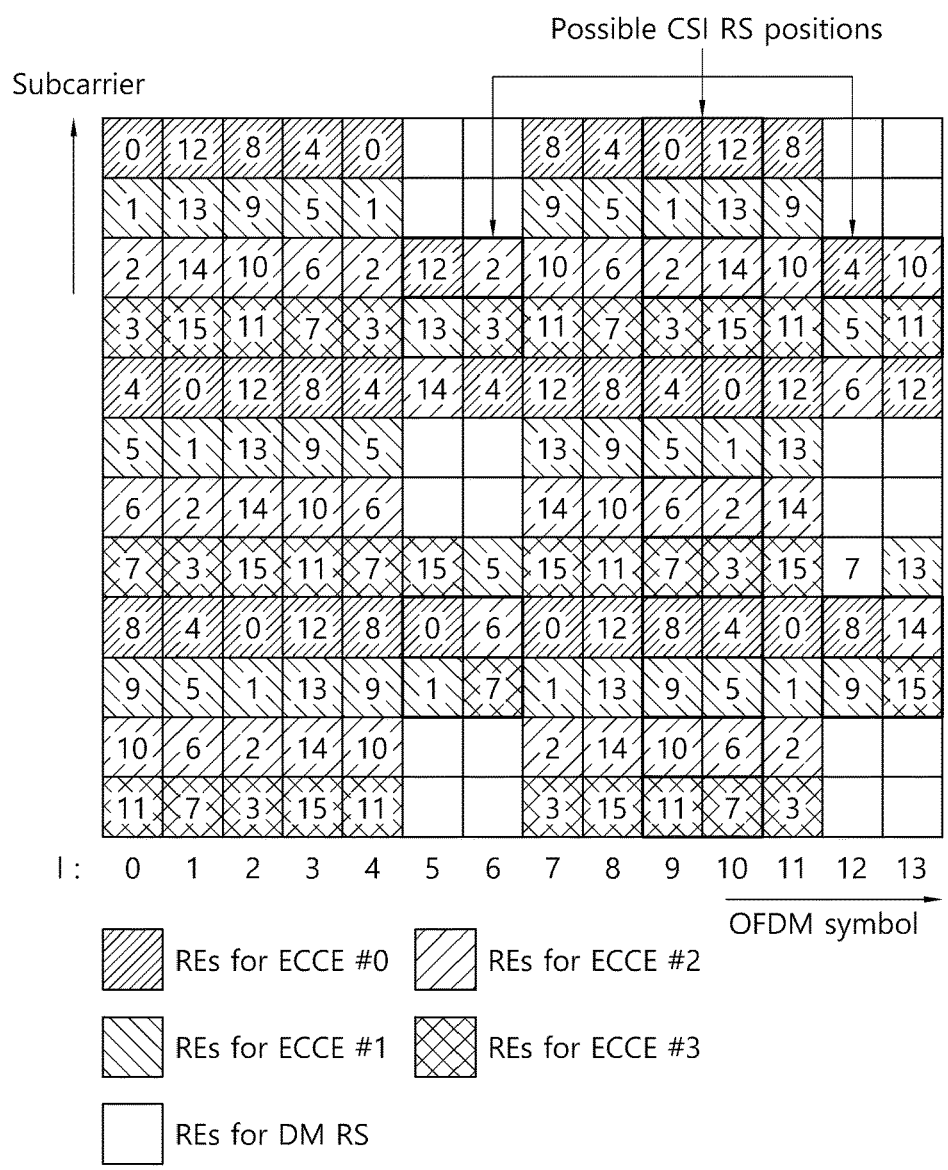
FIG. 10 illustrates an example of a PRB pair.

FIG. 10 illustrates an example of a PRB pair.

Although it is shown below that a subframe includes two slots and a PRB pair in one slot includes seven OFDM symbols and 12 subcarriers, these numbers of OFDM symbols and subcarriers are provided for illustrative purposes only.

In one subframe, a PRB pair includes 168 REs. 16 EREGs are formed from 144 Res, excluding 24 REs for a DM RS. Thus, one EREG may include nine REs. Here, a CSI-RS or CRS may be disposed in one PRB pair in addition the DM RM. In this case, the number of available REs may be reduced and the number of REs included in one EREG may be reduced. The number of REs included in an EREG may change, while the number of EREGs included in one PRB pair, 16, does not change.

Here, as illustrated in FIG. 10, REs may sequentially be assigned indexes, starting from a top subcarrier in a leftmost OFDM symbol (l=0) (or REs may sequentially be assigned indexes in an upward direction, starting from a bottom subcarrier in the leftmost OFDM symbol (l=0)). Suppose that 16 EREGs are assigned indexes from 0 to 15. Here, nine REs having RE index 0 are allocated to EREG 0. Likewise, nine REs having RE index k (k=0, . . . , 15) are allocated to EREG k.

A plurality of EREGs is combined to define an EREG group. For example, an EREG group including four EREGs may be defined as follows: EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. An EREG group including eight EREGs may be defined as follows: EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE may include four EREGs, and an ECCE may include eight EREGs in an extended CP. An ECCE is defined by an ERGE group. For example, FIG. 6 shows that ECCE #0 includes EREG group #0, ECCE #1 includes EREG group #1, ECCE #2 includes EREG group #2, and ECCE #3 includes EREG group #3.

There are localized transmission and distributed transmission in ECCE-to-EREG mapping. In localized transmission, an EREG group forming one ECCE is selected from EREGs in one PRB pair. In distributed transmission, an EREG group forming one ECCE is selected from EREGs in different PRB pairs.

Figure 11:
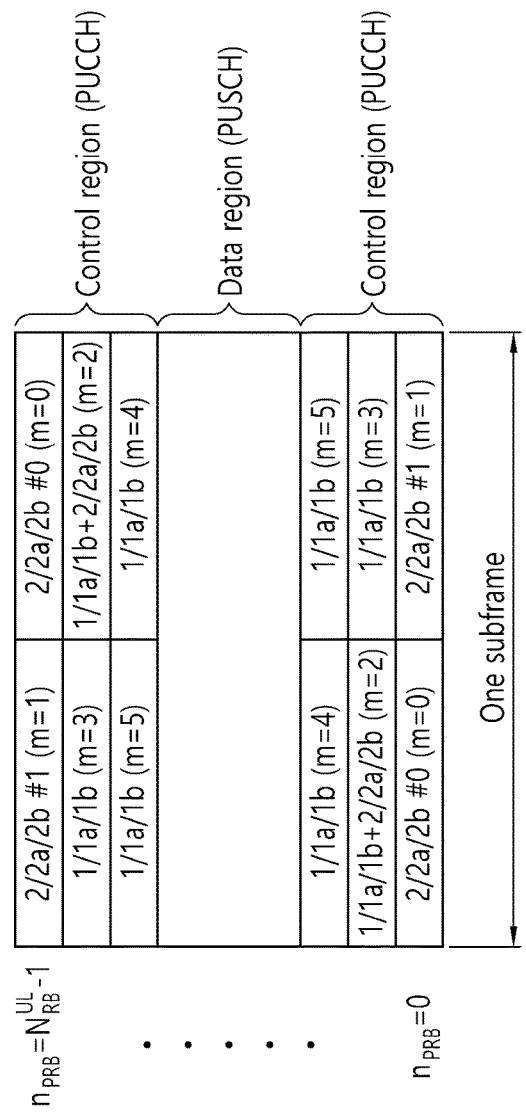
FIG. 11 illustrates a PUCCH and a PUSCH on an uplink subframe.

FIG. 11 illustrates a PUCCH and a PUSCH on an uplink subframe.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) mode may be applied. PUCCH format 1a transmits an acknowledgement/non-acknowledgment (ACK/NACK) modulated by a binary phase shift keying (BPSK) mode with respect to one codeword. PUCCH format 1b transmits an ACK/NACK modulated by a quadrature phase shift keying (QPSK) mode with respect to two codewords. PUCCH format 2 transmits a channel quality indicator (CQI) modulated by the QPSK mode. PUCCH formats 2a and 2b transport the CQI and the ACK/NACK.

Table 5 illustrates the PUCCH formats.

TABLE 5

| Format | Description |
|---|---|
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding mode (MCS), and the like. When the CQI is generated based on the MCS, the MCS includes a modulation mode, a coding mode, and a coding rate according to the coding mode, and the like.

The PMI provides information on a precoding matrix in precoding based on a code book. The PMI is associated with the multiple input multiple output (MIMO). The feedbacking of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation mode subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

Meanwhile, in the wireless communication system, the hybrid automatic repeat request (HARQ) may be used. The HARQ is a technique in which a transmitter transmits data and thereafter, receives an acknowledgement/not-acknowledgement (ACK/NACK) as reception acknowledgement information for the data and transmits new data or retransmits pre-transmitted data according to the ACK/NACK.

In 3rd Generation Partnership Project (3GPP) long term evolution (LTE)/long term evolution-advanced (LTE-A), the ACK/NACK may be transmitted through the physical uplink control channel (PUCCH) which is an uplink control channel.

Herein, time, frequency, and code resources used for transmitting an ACK/NACK signal are referred to as an ACK/NACK resource or a PUCCH resource. As described above, an index (this is referred to as a PUCCH index) for determining the PUCCH resource, that is, an index required for transmitting the ACK/NACK signal onto the PUCCH may be expressed by at least any one of (an orthogonal sequence index i, a cyclic shift index Ics, and a resource block index m) or an index n(1)PUCCH for acquiring the three indexes. In other words, the PUCCH resource may include at least any one of an orthogonal sequence, a cyclic shift, a resource bloc, and a combination thereof and an index which may represent the PUCCH resource may be referred to as the PUCCH index.

Meanwhile, when the ACK/NACK is transmitted through the PUCCH, the resource (the PUCCH resource) constituting the PUCCH may be implicitly or explicitly determined. For example, the PUCCH resource may be determined based on a resource occupied by a control channel that schedules a physical downlink shared channel (PDSCH) or data (a transport block or codeword) which becomes a target of the ACK/NACK response and the PUCCH resource is referred to as an implicit PUCCH resource. On the contrary, one or a plurality of resources is explicitly indicated by a higher-layer signal and when the resource is used, the corresponding resource is referred to as an explicit PUCCH resource.

Hereinafter, the uplink reference signal will be described.

Hereinafter, the uplink reference signal will be described based on Rel-8, but other additional matters including uplink reference signal transmission, and the like in the multiple antennas will be referred together with Rel-10 or Rel-11.

The reference signal is generally transmitted in sequence. As the reference signal sequence, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of primary sequence may be used for the DMRS and the SRS. Meanwhile, precoding applied to the DMRS in uplink multi-antenna transmission may be the same as precoding applied to the PUSCH. Cyclic shift separation is a primary mode that multiplexes the DMRS. In the LTE-A system, the SRS may not be precoded and further, may an antenna specific reference signal.

The SRS as a reference signal which the terminal or a relay station transmits to the base station is a reference signal which is not associated with uplink data or control signal transmission. The SRS may be generally used for channel quality estimation for frequency selective scheduling in the uplink or used for another purpose. For example, the SRS may be used in power control or initial MCS selection, initial power control for data transmission, and the like. The SRS is generally transmitted in a last SC-FDMA symbol of one subframe.

The SRS is defined by an SRS sequence $r_{SRS}(n)=r_{u,v}^{(\alpha)}(n)$. The reference signal sequence $r_{u,v}^{(\alpha)}(n)$ may be defined based on a primary sequence $b_{u,v}(n)$ and a cyclic shift $\alpha$ by Equation 4.

$$r_{u,v}^{(\alpha)}(n)=e^{j\alpha n}b_{u,v}(n), 0 \leq n < M_{sc}^{RS} \quad \text{[Equation 4]}$$

In Equation 4, $M_{sc}^{RS}(1 \leq m \leq N_{RB}^{max,UL})$ represents the length of the reference signal sequence and $M_{sc}^{RS}=m*N_{sc}^{RB}$. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying $\alpha$ which is the cyclic shift value from one primary sequence.

The primary sequence $b_{u,v}(n)$ is divided into a plurality of groups and in this case, $u \in \{0, 1, \ldots, 29\}$ represents a group index and v represents a primary sequence index in a group. The primary sequence depends on the length $(M_{sc}^{RS})$ of the primary sequence. Each group includes one primary sequence (v=0) in which the length is $M_{sc}^{RS}$ with respect to m of $1 \leq m \leq 5$ and includes two primary sequences (v=0, 1) in which the length is $M_{sc}^{RS}$ with respect to m of $6 \leq m \leq n_{RB}^{max,UL}$. A sequence group index u and a primary sequence index v in the group may vary depending on a time like group hopping or sequence hopping.

Again, in the SRS sequence, u represents the PUCCH sequence group index and v represents the primary sequence index. The cyclic shift value $\alpha$ is defined by Equation 5.

$$\alpha = 2\pi \frac{n_{SRS}^{cs}}{8} \quad \text{[Equation 5]}$$

$n_{SRS}^{cs}$ is a value configured by a higher layer with respect to each terminal and may be any one among integers of 0 to 7.

The SRS sequence is mapped to a resource element by multiplying $\beta_{SRS}$ which is an amplitude scaling factor in order to satisfy transmission power $P_{SRS}$. The SRS sequence may be mapped to a resource element (k,l) according to Equation 6 by starting from $r_{SRS}(0)$.

$$a_{2k+k_0,l} = \begin{cases} \beta_{SRS} r^{SRS}(k) & k=0,1,\ldots,M_{sc,b}^{RS}-1 \\ 0 & \text{otherwise} \end{cases} \quad \text{[Equation 6]}$$

In Equation 6, $k_0$ represents a starting position in the frequency domain of the SRS and $M_{sc,b}^{RS}$ represents the length of the SRS sequence defined by Equation 7.

$$M_{sc,b}^{RS}=m_{SRS,b}N_{sc}^{RB}/2 \quad \text{[Equation 7]}$$

In Equation 7, $m_{SRS,b}$ may be given by Tables 6 to 9 to be described below with respect to each uplink bandwidth $N_{RB}^{UL}$.

$k_0$ of Equation 6 may be defined by Equation 8.

$$k_0 = k_0' + \sum_{b=0}^{B_{SRS}} 2M_{sc,b}^{RS}n_b \quad \text{[Equation 8]}$$

In Equation 8, $k_0'$ is given by $k_0'=(\lfloor N_{RB}^{UL}/2 \rfloor - m_{SRS,0}/2)N_{SC}^{RB}+k_{TC}$ in a general uplink subframe. $k_{TC} \in \{0,1\}$ represents a parameter given to the terminal by the higher layer and $n_b$ represents a frequency position index.

The frequency hopping of the SRS is configured by a parameter $b_{hop} \in \{0,1,2,3\}$ given by the higher layer. When the frequency hopping of the SRS is not available ($b_{hop} \geq B_{SRS}$), the frequency position index is determined by a constant of $n_b = \lfloor 4n_{RRC}/m_{SRS,b} \rfloor \bmod N_b$ and $n_{RRC}$ is given by the higher layer. When the frequency hopping of the SRS is available ($b_{hop} < B_{SRS}$), the frequency position index $n_b$ is determined by Equation 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor \bmod N_b & \text{otherwise} \end{cases} \quad [\text{Equation 9}]$$

$N_b$ may be determined by Tables 6 to 9 to be described and $F_b(n_{SRS})$ may be determined by Equation 10.

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad [\text{Equation 10}]$$

In Equation 10, $n_{SRS}$ represents the number of terminal specific SRS transmission times and may be determined by Equation 11.

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of frame structure 2} \\ \lfloor (n_f \times 10 + \lfloor n_s/2 \rfloor)/T_{SRS} \rfloor, & \text{otherwise} \end{cases} \quad [\text{Equation 11}]$$

In Equation 11, $T_{SRS}$ represents terminal specific periodicity of the SRS transmission, $T_{offset}$ represents an SRS subframe offset, and $T_{offset\_max}$ represents a maximum value of $T_{offset}$ for a specific configuration of the SRS subframe offset. $T_{SRS}$ and $T_{offset}$ may be given by Tables 12 and 13 to be described below.

Tables 6 to 9 show one example of an SRS bandwidth configuration. 3-bit cell specific parameters may be broadcasted in order to indicate one bandwidth configuration of 8 bandwidth configurations. Further, 2-bit terminal specific parameters may be given from the higher layer in order to indicate one bandwidth configuration of 4 bandwidth configurations.

Table 6 shows one example of $m_{SRS,b}$ and $N_b$ (however, b=0, 1, 2, 3) when $N_{RB}^{UL}$ is in the range of $6 \leq N_{RB}^{UL} \leq 40$.

TABLE 6

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 7 shows one example of $m_{SRS,b}$ and $N_b$ (however, b=0, 1, 2, 3) when the uplink bandwidth $N_{RB}^{UL}$ is in the range of $40 \leq N_{RB}^{UL} \leq 60$.

TABLE 7

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 8 shows one example of $m_{SRS,b}$ and $N_b$ (however, b=0, 1, 2, 3) when the uplink bandwidth $N_{RB}^{UL}$ is in the range of $60 \leq N_{RB}^{UL} \leq 80$.

TABLE 8

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 9 shows one example of $m_{SRS,b}$ and $N_b$ (however, b=0, 1, 2, 3) when the uplink bandwidth $N_{RB}^{UL}$ is in the range of $80 \leq N_{RB}^{UL} \leq 110$.

TABLE 9

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |

TABLE 9-continued

| SRS bandwidth configuration $C_{SRS}$ | SRS-Bandwidth $B_{SRS}=0$ $m_{SRS,0}$ | $N_0$ | SRS-Bandwidth $B_{SRS}=1$ $m_{SRS,1}$ | $N_1$ | SRS-Bandwidth $B_{SRS}=2$ $m_{SRS,2}$ | $N_2$ | SRS-Bandwidth $B_{SRS}=3$ $m_{SRS,3}$ | $N_3$ |
|---|---|---|---|---|---|---|---|---|
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Tables 6 to 9, $C_{SRS} \in \{0,1,2,3,4,5,6,7\}$ which is the cell specific parameters and $B_{SRS} \in \{0,1,2,3\}$ which is the terminal specific parameter are given by the higher layer.

Tables 10 and 11 show one example of a cell specific subframe configuration periodicity parameter $T_{SFC}$ for the SRS transmission and one example of a cell specific subframe offset parameter $\Delta_{SFC}$.

Table 10 shows one example of an SRS subframe configuration in an FDD system. According to Table 10, the SRS subframe configuration may be indicated by a parameter having a length of 4 bits and the periodicity of the SRS subframe may be any one of subframes 1, 2, 5, and 10.

TABLE 10

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 11 shows one example of an SRS subframe configuration in a TDD system.

TABLE 11

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

An operation in the terminal for transmitting the SRS will be described below.

When the terminal transmits the SRS, the transmission power $P_{SRS}$ in subframe i may be determined by Equation 12.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\} \quad \text{[Equation 12]}$$

In Equation 12, $P_{CMAX}$ represents the transmission power of a predetermined terminal. $P_{SRS\_OFFSET}$ represents a terminal specific parameter having a length of 4 bits, which is semi-statically determined by the higher layer. When Ks=1.25, $P_{SRS\_OFFSET}$ may be determined by the unit of 1 dB in the range of [−3, 12] dB. When Ks=0, $P_{SRS\_OFFSET}$ may be determined by the unit of 1.5 dB in the range of [−10.5, 12] dB. $M_{SRS}$ represents the bandwidth of the SRS transmission, which is represented by the number of resource blocks and $P_{O\_PUSCH}(j)$ represents a parameter configured by the sum of $P_{O\_NOMINAL\_PUSCH}(j)$ which is a cell specific nominal component given by the higher layer and $P_{O\_UE\_PUSCH}(j)$ which is a terminal specific component given by the higher layer. $\alpha(j)$ represents a 3-bit cell specific parameter given by the higher layer, PL represents an estimation value of path loss calculated by the terminal, and f(i) represents a current power control adjustment state for the PUSCH.

When the terminal may select a transmission antenna, in the case where an index $a(n_{SRS})$ of a terminal antenna that transmits the SRS at the $n_{SRS}$ time may be given as $a(n_{SRS}) = n_{SRS} \mod 2$ with respect to a full sounding bandwidth or a partial sounding bandwidth in the case where the frequency hopping is not available and given by Equation 13 in the case where the frequency hopping is available.

$$a(n_{SRS}) = \begin{cases} (n_{SRS} + \lfloor n_{SRS}/2 \rfloor + \beta \cdot \lfloor n_{SRS}/K \rfloor) \mod 2 & \text{when } K \text{ is even} \\ n_{SRS} \mod 2 & \text{when } K \text{ is odd} \end{cases} \quad \text{[Equation 13]}$$

In Equation 13, $B_{SRS}$ represents an SRS bandwidth and $b_{hop}$ represents a frequency hopping bandwidth. $N_b$ may be determined by a predetermined table by $C_{SRS}$ and $B_{SRS}$.

$$K = \prod_{b'=b_{hop}}^{B_{SRS}} N_{b'}.$$

In Equation 13, β of Equation 13 may be determined by Equation 14.

$$\beta = \begin{cases} 1 & \text{where } K \bmod 4 = 0 \\ 0 & \text{otherwise} \end{cases} \quad \text{[Equation 14]}$$

In the TDD system, when one SC-FDMA symbol is present in an uplink pilot time slot (UpPTS), the corresponding SC-FDMA symbol may be used for transmitting the SRS. When two SC-FDMA symbols are present in the UpPTS, two corresponding SC-FDMA symbols may be all used for transmitting the SRS and simultaneously assigned to one terminal.

When the transmission of the SRS and transmission of PUCCH format 2/2a/2b simultaneously occur in the same subframe, the terminal does not transmit the SRS.

If an ackNackSRS-SimultaneousTransmission parameter is false, when the SRS transmission and transmission of the PUCCH transporting the ACK/NACK and/or a positive SR are performed in the same subframe, the terminal does not continuously transmit the SRS. Further, if an ackNackSRS-SimultaneousTransmission parameter is true, when the SRS transmission and the transmission of the PUCCH transporting the ACK/NACK and/or the positive SR are configured in the same subframe, the terminal uses a shortened PUCCH format and simultaneously transmits the PUCCH transporting the ACK/NACK and/or the positive SR and the SRS. That is, when the PUCCH transporting the ACK/NACK and/or the positive SR are configured in a cell specifically configured SRS subframe, the terminal uses the shortened PUCCH format and simultaneously transmits the PUCCH transporting the ACK/NACK and/or the positive SR and the SRS. When the SRS transmission overlaps with a physical random access channel (PRACH) region for preamble format 4 or exceeds the range of an uplink system bandwidth configured in the cell, the terminal does not transmit the SRS.

The ackNackSRS-SimultaneousTransmission which is the parameter given by the higher layer determines whether support that the terminal simultaneously transmits the PUCCH transporting the ACK/NACK and the SRS in one subframe. When the terminal is configured to simultaneously transmit the PUCCH transporting the ACK/NACK and the SRS in one subframe, the terminal may transmit the ACK/NACK and the SRS in the cell specific SRS subframe. In this case, the shortened PUCCH format may be used and transmission of the ACK/NACK or SR corresponding to a position where the SRS is transmitted is omitted (punctured). The shortened PUCCH format is used in the cell specific SRS subframe even when the terminal does not transmit the SRS in the corresponding subframe. When the terminal is configured not to simultaneously transmit the PUCCH transporting the ACK/NACK and the SRS in one subframe, the terminal may use general PUCCH format 1/1a/1b in order to transmit the ACK/NACK and the SR.

Tables 12 and 13 show one example of the terminal specific SRS configuration indicating $T_{SRS}$ which is the SRS transmission periodicity and $T_{offset}$ which is the SRS subframe offset. The SRS transmission periodicity $T_{SRS}$ may be determined as any one of {2, 5, 10, 20, 40, 80, 160, 320} ms.

Table 12 shows one example of the SRS configuration in the FDD system.

TABLE 12

| SRS Configuration Index $I_{SRS}$ | RS Periodicity $ST_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 13 shows one example of the SRS configuration in the TDD system.

TABLE 13

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In the TDD system, $T_{SRS}>2$ and in the FDD system, the SRS subframe satisfies $(10*n_f+k_{SRS}-T_{offset})$ mod $T_{SRS}=0$. $n_f$ represents a frame index and $k_{SRS}$ represents a subframe index in the frame in the FDD system. In the TDD system, when $T_{SRS}=2$, two SRS resources may be configured in a half frame including at least one uplink subframe and the SRS subframe satisfies $(k_{SRS}-T_{offset})$ mod $5=0$.

In the TDD system, $k_{SRS}$ of Equation 13 may be determined by Table 14.

TABLE 14

| | subframe index n | | | | | | | | | |
|---|---|---|---|---|---|---|---|---|---|---|
| | | 1 | | | | | | 6 | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |

TABLE 14-continued

| | subframe index n | | | | | | | | | | | |
|---|---|---|---|---|---|---|---|---|---|---|---|---|
| | 1 | | | | | | 6 | | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 1 symbol | | 1 | | 2 | 3 | 4 | | 6 | | 7 | 8 | 9 |

Meanwhile, when the transmission of the SRS and transmission of the PUSCH corresponding to retransmission of the same transport block as a predetermined access response grant or a part of a contention based predetermined access procedure are performed in the same subframe, the terminal does not continuously transmit the SRS.

An SRS transmitting method may be divided into two types. A method defined in LTE rel-8 includes a periodic SRS transmitting method that periodically transmits the SRS according to an SRS parameter received by radio resource control (RRC) signaling and an aperiodic SRS transmitting method that transmits the SRS whenever necessary based on a message dynamically triggered from the base station. In the LTE-A, the aperiodic SRS transmitting method may be adopted.

Meanwhile, in the periodic SRS transmitting method and the aperiodic SRS transmitting method, the SRS may be transmitted in the terminal specific SRS subframe which is UE-specifically determined. In the periodic SRS transmitting method defined in the LTE rel-8, the cell specific SRS subframe is periodically configured by the cell specific SRS parameter and a periodic SRS is transmitted in a periodic terminal specific SRS subframe configured by the terminal specific SRS parameter among the cell specific SRS subframes. In this case, the periodic terminal specific SRS subframe may be a subset of the cell specific SRS subframe. The cell specific SRS parameter may be given by the higher layer. In the aperiodic SRS transmitting method, an aperiodic SRS may be transmitted in an aperiodic terminal specific SRS subframe determined by a terminal specific aperiodic SRS parameter. The aperiodic terminal specific SRS subframe in the aperiodic SRS transmitting method may be a subset of the cell specific SRS subframe as defined in the LTE rel-8. Alternatively, the aperiodic terminal specific SRS subframe may be the same as the cell specific SRS subframe. The terminal specific aperiodic SRS parameter may also be given by the higher layer similarly to the cell specific SRS parameter. The terminal specific aperiodic SRS subframe may be configured by the subframe periodicity and the subframe offset of Table 7 or 8 described above.

<Disclosures of Present Specification>

Hereinafter, the disclosures of the present specification will be described with reference to drawings.

The disclosures of the present specification have been made in an effort to present a mode that solves the problem.

A situation may be considered, in which the PUCCH is transmitted in a secondary cell (SCell) for the purpose of offloading for the PUCCH even with respect to a cell or a cell group having the same geographical position in a next system.

The SCell that may transmit the PUCCH may be determined in a step in which the terminal configures the corresponding serving cell and it may be considered that a plurality of configured cells dynamically selects the cell that will transmit the PUCCH.

The cell that may transmit the PUCCH will be referred to as a primary cell (PCell) and/or a primary SCell (pSCell) for easy description.

An uplink (UL) channel environment needs to be considered in selecting the pSCell and estimating a channel environment of each serving cell through the SRS which the terminal transmits may be considered.

Selecting the PUSCH and the PUCCH based on the same SRS through the SRS transmission (including a hopping mode) for the full uplink bandwidth (UL BW) including the PUCCH region in a situation in which downlink (DL) traffic and uplink traffic are similar may be considered.

However, a general situation is a situation in which the downlink traffic is relatively higher than the uplink traffic and in this case, a situation in which a transmission frequency of the PUCCH is higher than a transmission frequency of the PUSCH may be considered.

In such a situation, even with respect to the SRS (even including the PUCCH region) for the PUSCH, uplink (UL) overhead may be inefficient.

In particular, in the case of TDD carrier aggregation (CA), the uplink overhead may be more inefficient in a situation in which the uplink of the SCell is guaranteed.

As a next best plan, separately configuring the SRS for the PUSCH and the SRS (including all channels/signals that enable the base station to estimate uplink performance of the PUCCH) for the PUCCH may be advantageous in terms of the uplink overhead.

That is, the base station may configure whether to additionally transmit the SRS for the PUCCH in configuring the SRS with respect to the PUSCH in the related art to the terminal through the higher layer and when whether to additionally transmit the SRS for the PUCCH is configured, additionally configuring the configuration for the corresponding SRS may be considered.

Accordingly, the disclosures of the present specification propose a detailed configuration or transmission mode for the SRS for the PUCCH in a PUCCH offloading situation.

In detail, a first disclosure among the disclosures of the present specification presents an offloading target configuring mode for the PUCCH, a second disclosure among the disclosures of the present specification presents a configuration mode of the SRS configuration, and a third disclosure among the disclosures of the present specification presents a detailed configuration mode for the SRS.

<First Disclosure of Present Specification—PUCCH Offloading Target Configuring Mode>

As described above, in the first disclosure of the present specification, the configuration mode of the offloading target for the PUCCH is described.

In detail, a UCI which may be transmitted through the PUCCH may be constituted by a scheduling request (SR), an HARQ-ACK, a periodic CSI, and the like.

Further, a method for allocating resources in PUCCH format 1a/1b, PUCCH format 1b (with channel selection), PUCCH format 2/2a/2b, PUCCH format 3, and the like as transmission formats, respectively and the number of resources which may be simultaneously transmitted per RB may be independently designated.

When in the PUCCH transmission, offloading to a plurality of cells is performed (when the terminal receives the configuration from the base station), the PUCCH to be offloaded may be differently configured according to the UCI to be transmitted or the PUCCH format and the offloading may be performed with respect to all PUCCH transmissions.

Next, detailed modes at the time of designating the target of the PUCCH offloading according to the UCI will be described.

Mode 1-1

The mode 1-1 is a mode that performs offloading of all UCIs.

Mode 1-2

The mode 1-2 is a mode that performs offloading of only the periodic CSI. In detail, the mode 1-2 may be limited to a case of the SR subframe and in particular, limited to a case in which the SR is transmitted in the SR subframe. In this case, the SR and the periodic CSI may be simultaneously transmitted.

Mode 1-3

The mode 1-3 is a mode that performs offloading of only the HARQ-ACK.

Mode 1-4

The mode 1-4 is a mode that performs offloading of only the SR.

In detail, the mode 1-4 may be limited to a subframe in which the periodic CSI is transmitted. In this case, the SR and the periodic CSI may be simultaneously transmitted.

Mode 1-5

The mode 1-5 is a mode that performs offloading of only the HARQ-ACK and the SR.

Mode 1-6

The mode 1-6 is a mode that performs offloading of the remainder other than the UCI corresponding to the PCell.

Mode 1-7

The mode 1-7 is a mode that performs offloading of the remainder other than PCell HARQ-ACK and/or SR.

Mode 1-8

The mode 1-8 is a mode that the base station signals the UCI to be offloaded to the terminal through the higher layer and the terminal performs the PUCCH offloading based on the corresponding information.

Herein, a UCI which is not offloaded may be transmitted through the PCell. The offloaded PUCCH may be transmitted with respect to all serving cells including the PCell.

Next, a mode that designates the target of the PUCCH offloading according to the PUCCH format will be described.

Mode 2-1

The mode 2-1 is a mode that performs offloading of all PUCCH formats.

Mode 2-2

The mode 2-2 is a mode that performs offloading of only PUCCH format 1.

Mode 2-3

The mode 2-3 is a mode that performs offloading of only PUCCH format 1/1a/1b. In detail, channel selection may be excluded in the case of PUCCH format 1b.

Mode 2-4

The mode 2-4 is a mode that performs offloading of only PUCCH format 2/2a/2b.

Mode 2-5

The mode 2-5 is a mode that performs offloading of only PUCCH format 3.

Mode 2-6

The mode 2-6 is a mode that performs offloading of only PUCCH format 1/1a/1b/3.

Mode 2-7

The mode 2-7 is a mode that the base station signals each format to be offloaded to the terminal through the higher layer and the terminal performs the PUCCH offloading based on the corresponding information.

Herein, the UCI which is not offloaded may be transmitted through the PCell and selecting the PUCCH to be offloaded may be configured through combining a simultaneous transmission configuration of the UCI and the format.

<Second Disclosure of Present Specification—SRS Configuring Mode>

As described above, in the second disclosure of the present specification, the SRS configuring mode is described.

Fundamentally, when the base station adopts the SRS transmission for the PUCCH or configures the SRS transmission for the PUCCH to the terminal, the configuration for the PUCCH SRS may be additionally configured independently from the configuration for the SRS (the SRS of Rel-11 in the related art) for the PUSCH.

As components of the configuration, the configuration may be constituted by periodicity, SF offset, cell-specific bandwidth configuration, UE-specific bandwidth configuration, and the like (see the Rel-11).

As another mode, it may be considered that the SRS subframe region is shared by the PUSCH. As one example, when the SRS transmittable subframe for the PUCCH is designated as a region that satisfies $\lfloor n_s/2 \rfloor \mod T_{SFC} \in \Delta_{SFC}$, the SRS transmittable subframe for the PUSCH may be designated as a region that satisfies $(\lfloor n_s/2 \rfloor - \text{offset1}) \mod m_1 T_{SFC} \in \Delta_{SFC}$. In the above description, offset1 and $m_1$ may be values configured for the terminal in the base station and it may be considered that the values are also expressed in a reverse form.

As yet another mode, a mode may be adopted, in which the SRS for the PUSCH depends on aperiodic SRS (type 1 SRS) and the SRS for the PUCCH depends on periodic SRS (type 0 SRS).

The SRS for the PUSCH and the SRS for the PUCCH in the related art with respect to a single cell may collide with each other in the same subframe and an execution procedure for the collision may be required. As one example, with respect to a terminal in which simultaneous transmission of the PUCCH and the PUSCH is not configured or clustered allocated PUSCH transmission is not supported, simultaneous transmission of the SRS for the PUSCH and the SRS for the PUCCH may not be supported and in this case, a priority between both SRSs needs to be configured. Configuring the priority based on the channel which becomes the target of the corresponding SRS may be considered.

Next, a mode that configures the priority of the SRS according to the second disclosure of the present specification will be described.

Mode 3-1

The mode 3-1 is a mode that configures the priority of the SRS for the PUCCH to be higher than the priority of the SRS for the PUSCH.

The mode 3-1 may be to configure the priority of the PUCCH to be higher than the priority of the PUSCH and efficiently manage downlink (DL) throughput performance.

Mode 3-2

The mode 3-2 is a mode that configures the priority based on a range of a bandwidth (BW) covered by the SRS according to a configuration with respect to heterogeneous SRSs.

As one example, a start point and an end point of a full BW covered by the SRS may be compared with each other and thereafter, the priority may be determined based on the amount of the covered region.

For example, the bandwidths of the SRS for the PUSCH and the SRS for the PUCCH are an entire region (in a non-contiguous case, a location where the frequency index is the lowest and a location where the frequency index is the highest) and in the case of the SRS for the PUSCH, when the SRS may be transmitted even with respect to a middle region even in addition to both ends, the priority of the SRS for the PUSCH may be configured to be high.

Mode 3-3

The mode 3-3 is a mode that configures the priority through the higher layer.

Mode 3-4

The mode 3-4 is a mode that configures the priority of the SRS for the PUSCH to be higher than the priority of the SRS for the PUCCH in order to conserve the existing operation.

Herein, the SRS for the PUSCH may be construed as the SRS of the Rel-11 and the SRS for the PUCCH may be construed as an additionally adopted SRS.

Next, a mode that configures the priority at the time of SRS collision among other cells with respect to configured cells will be described.

Mode 4-1

The mode 4-1 is a mode that configures the priority of the SRS for the PUCCH to be higher than the priority of the SRS for the PUSCH. The mode 3-1 may be to configure the priority of the PUCCH to be higher than the priority of the PUSCH and efficiently manage the downlink (DL) throughput performance.

Mode 4-2

The mode 4-2 is a mode that configures the priority based on the range of the bandwidth (BW) covered by the SRS according to the configuration with respect to the heterogeneous SRSs.

As one example, the start point and the end point of the full BW covered by the SRS may be compared with each other and thereafter, the priority may be determined based on the amount of the covered region.

For example, the bandwidths of the SRS for the PUSCH and the SRS for the PUCCH are the entire region (in a non-contiguous case, a location where the frequency index is the lowest and the location where the frequency index is the highest) and in the case of the SRS for the PUSCH, when the SRS may be transmitted even with respect to the middle region even in addition to both ends, the priority of the SRS for the PUSCH may be configured to be high.

Mode 4-3

The mode 4-3 is a mode that configures the high priority in the SRS corresponding to the PCell when the SRS is transmitted in the PCell.

In detail, the mode 4-3 is a mode that configures the priority of the SRS corresponding to a cell having the lowest SCell index among SCells to be high when the SRS is not transmitted in the PCell.

As one example, when the SRS for the PUSCH is transmitted in the PCell, the SRS for the PUSCH may have the higher priority than the SRS for the PUCCH.

Mode 4-4

The mode 4-4 is a mode that configures the priority through the higher layer.

Meanwhile, when the SRS for the PUSCH and the SRS for the PUCCH may be simultaneously transmitted, it may be considered that power scaling may be considered with respect to all SRSs to be transmitted like the Rel-11 in the related art with respect to a power limited terminal.

Further, weighted scaling considering a weighted value with respect to one SRS among the heterogeneous SRSs may be considered.

Herein, the selected SRS may be an SRS corresponding to the PUCCH. Alternatively, the selected SRS may be an SRS corresponding to the PCell or an SRS corresponding to an SCell having the lowest SCell index when there is no PCell.

As the priority between the SRS for other channel and the SRS for the PUCCH, it may be assumed that the priority for the PUCCH also has the same priority as the SRS of the Rel-11 in the related art. As one example, the periodic SRS for the PUCCH may have a lower priority than the periodic CSI.

<Third Disclosure of Present Specification—SRS Configuring Mode>

As described above, in the third disclosure of the present specification, the SRS configuring mode is described.

The method according to the third disclosure of the present specification as a method for transmitting a sound reference signal (SRS) by a terminal in a wireless communication system may include: receiving an SRS configuration from a base station by the terminal; determining an SRS subframe to which the SRS is to be transmitted among a plurality of subframes and an SRS transmission region to which the SRS is to be transmitted in a physical uplink control channel (PUCCH) region on the SRS subframe, on the basis of the received SRS configuration; and transmitting the SS to the SRS transmission region on the determined SRS subframe.

Herein, when the SRS and a PUCCH are simultaneously transmitted to the SRS transmission region, the SRS and the PUCCH may be multiplexed on the basis of code division multiplexing (CDM).

The multiplexing may be based on an orthogonal cover code (OCC).

Further, the SRS subframe may include two slots including a plurality of orthogonal frequency division multiplexing (OFDM) symbols and the SRS may be transmitted in the last OFDM symbol in each of the two slots.

In addition, the SRS may be transmitted to be symmetric based on the center of the uplink bandwidth.

Moreover, the SRS subframe may include two slots including the plurality of OFDM symbols and the SRS may be transmitted in any one OFDM symbol of each of the two slots.

Besides, the any one OFDM symbol may be designated in the SRS configuration or predesignated according to a radio network temporary identifier (RNTI) of the terminal.

Further, the SRS subframe may include two slots including the plurality of orthogonal frequency division multiplexing (OFDM) symbols and the SRS may be transmitted in the OFDM symbol corresponding to all or some of the DMRSs among the plurality of OFDM symbols.

In addition, the SRS may be transmitted based on PUCC format 3.

Moreover, the SRS may be transmitted onto the PUCCH resource allocated based on the UL grant.

In detail, the third disclosure of the present specification will be described below.

In general, the SRS may be transmitted in a frequency hopping form by the unit (a period depending on the SRS subframe configuration) of the subframe in the PUSCH region other than the PUCCH region or a full uplink bandwidth region (only for the UpPts) according to the configuration.

Figure 12:
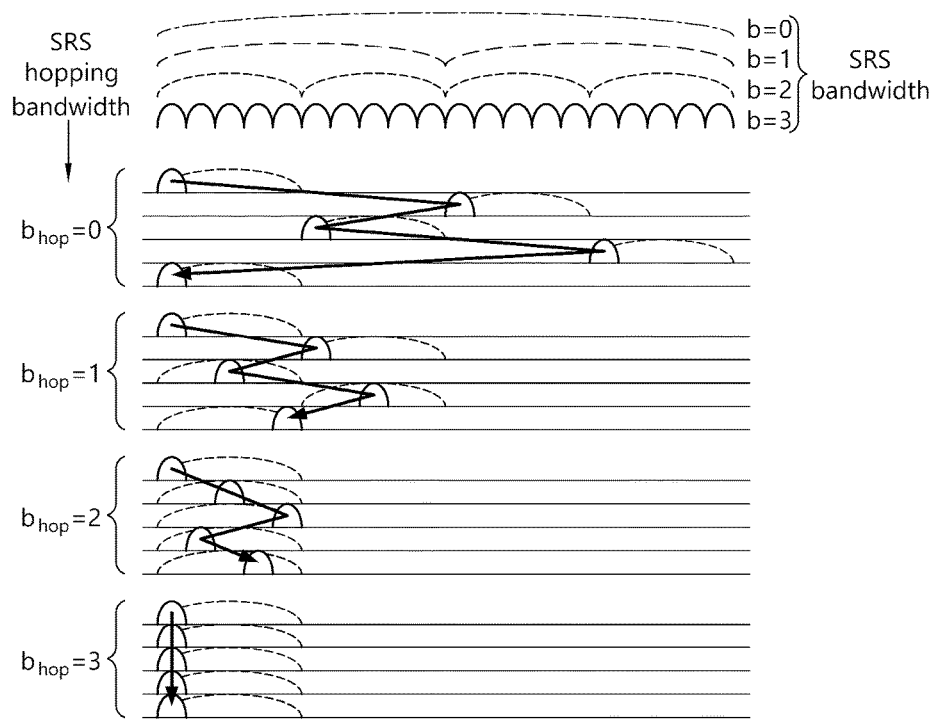
FIG. 12 illustrates one example of SRS transmission depending on an SRS bandwidth configuration for each subframe or subframe bundle unit.

FIG. 12 illustrates one example of SRS transmission depending on an SRS bandwidth configuration for each subframe or subframe bundle unit.

When the SRS is transmitted so that the base station estimates a channel quality for the PUCCH transmission, a method that configures the corresponding SRS so as to transmit the SRS in the full uplink bandwidth (even in a normal subframe) in the SRS for the PUSCH in the related art may be considered and adopting a new SRS may be considered.

In designing the new SRS, a frequency hopping effect (e.g., slot hopping or subframe hopping) and transmitting the SRS for the corresponding PUCCH in the PUCCH region like PUCCH transmission may be fundamentally considered. In this case, the new SRS may be an SRS sequence form or a partial symbol form of the PUCCH.

Next, the SRS configuring mode according to the third disclosure of present specification will be described.

1. Configuration Mode A—Mode for Extending Rel-11 SRS in Related Art

Up to the Rel-11 system, the SBS may be transmitted in the full uplink bandwidth according to the SRS only for the UpPts. The reason is that the PUCCH is not transmitted in the UpPts.

On the contrary, since it is generally considered that the PUCCH is transmitted with respect to the normal subframe, the SRS may be transmitted at least with respect to a region other than 1 RB (a total of 2 RBs) at both ends of the bandwidth for a partial uplink bandwidth.

In configuring the SRS for channel estimation of the PUCCH region, when the SRS for the PUSCH is first extended based on the Rel-11 SRS in the related art, it may be considered that a section in which the SRS is transmittable is configured to include the full bandwidth region with respect to all uplink bandwidths.

As one example, a value of $m_{SRS,0}$ configured for each uplink bandwidth in configuring the SRS bandwidth may be modified or added to have a value of the corresponding uplink bandwidth.

Further, the SRS may be configured to be transmitted in the full uplink bandwidth by adding an offset in calculating $M_{sc,b}^{RS}$ designating the length of an SRS sequence and $k_0^{(p)}$ representing a frequency start position for the SRS.

The offset may be a signal which the base station configures and signals for the terminal or a predetermined value. When the offset is the predetermined value, the offset may be 0 or nonzero according to whether to support the SRS for the PUCCH.

Equations given below show detailed examples regarding the addition of the offset.

$$M_{sc,b}^{RS}=(m_{SRS,b}+\text{offset}_b)N_{sc}^{RB}/2 \quad \text{[Equation 15]}$$

$$\overline{k}_0^{(p)}=(\lfloor N_{RB}^{UL}/2 \rfloor - (m_{SRS,0}+\text{offset}_0)/2)N_{SC}^{RB}+k_{TC}^{(p)} \quad \text{[Equation 16]}$$

When a shortened PUCCH is not configured in a target cell or simultaneous transmissions with the SRS is not supported like PUCCH format 2/2a/2b, estimating the channel quality for the PUCCH region may be inefficient by an SRS drop depending on the PUCCH transmission. Further, in the above case, while even the SRS for the PUSCH is simultaneously dropped, the PUSCH transmission may also be inefficiently operated.

As another example of the method for extending the SRS, additionally adopting the SRS configuration and the SRS transmission is considered in order to estimate the channel quality for the PUCCH and the SRS may be transmitted in the full uplink bandwidth, in particular, a region including the PUCCH region and even in the case of a hopping pattern, only the PUCCH region or a region in which the SRS is not transmitted may be designated.

As the mode that allows the region in which the SRS is transmittable to include the PUCCH region, a mode through the additional offset may be considered like the mode that extends the SRS in the related art or redefining the SRS bandwidth configuration may be considered.

As one example, the Rel-11 SRS in the related art is configured to be transmitted only in the PUSCH region in order to estimate the PUSCH channel quality and the base station may configure to transmit the additionally SRS only in the PUCCH region for the terminal.

2. Configuration Mode B—Configuration of Non-Contiguous SRS

Adopting the new SRS may be considered in order to estimate the channel quality of the PUCCH region.

The SRS may be transmitted in a plurality of frequency regions in order to show an effect for slot hopping (a mapping structure of a frequency hopping form with respect to the slot in the subframe) of the PUCCH.

As one example, it may be considered that the SRS for the PUCCH is transmitted simultaneously in RB index m and $N_{RB}^{UL}-m$ in the last OFDM symbol of the subframe in which the SRS is transmitted when the uplink bandwidth is $N_{RB}^{UL}$.

Figure 13:
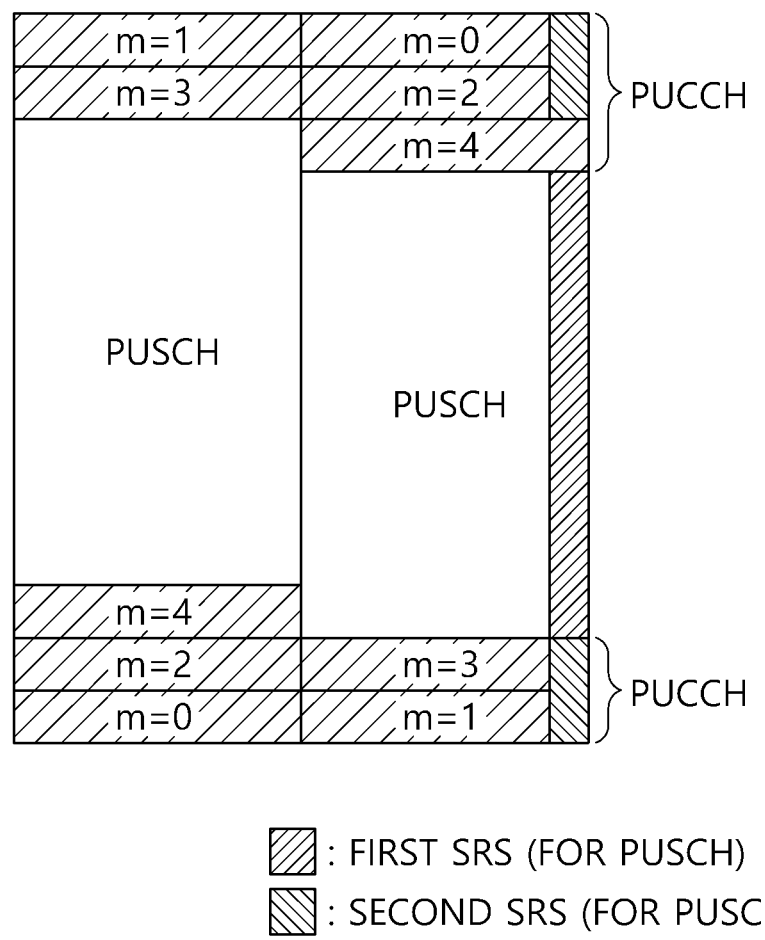
FIG. 13 illustrates one example for a case where an SRS for the PUSCH and an SRS for the PUCCH are simultaneously transmitted.

FIG. 13 illustrates one example for a case where an SRS for the PUSCH and an SRS for the PUCCH are simultaneously transmitted.

Referring to FIG. 13, even in a situation in which only a second SRS (hereinafter, referred to an SRS for the PUCCH) is transmitted, the terminal needs to be able to support non-contiguous transmission even with respect to the same band.

Therefore, the configuration scheme B relates to a case where simultaneous transmission of the PUCCH and since the PUSCH is configured and the corresponding second SRS may be frequently dropped at the time of the additional PUCCH transmission, the configuration scheme may be a case where the shortened PUCCH is configured and may relate to a case where the PUCCH region in which the second SRS is transmitted is also a region for PUCCH format 1/1a/1b/3.

3. Configuration Mode C—Configuration of PUCCH-Based SRS

Fundamentally, the PUCCH may have a plurality of PUCCH resources in the same RB and each PUCCH resource may be divided in a combination form of the cyclic shift and/or the orthogonal cover code (OCC).

Accordingly, when the appropriate cyclic shift value is allocated to the second SRS (the SRS for the PUCCH), it may be considered that the appropriate cyclic shift value is divided through the CDM even at the time of the collision with the PUCCH.

Next, a mode that transmits the PUCCH form based SRS will be described.

Mode C-1

The mode C-1 is a mode that transmits the last OFDM symbol of each slot in a region where the transmission of the second SRS is configured.

Figure 14:
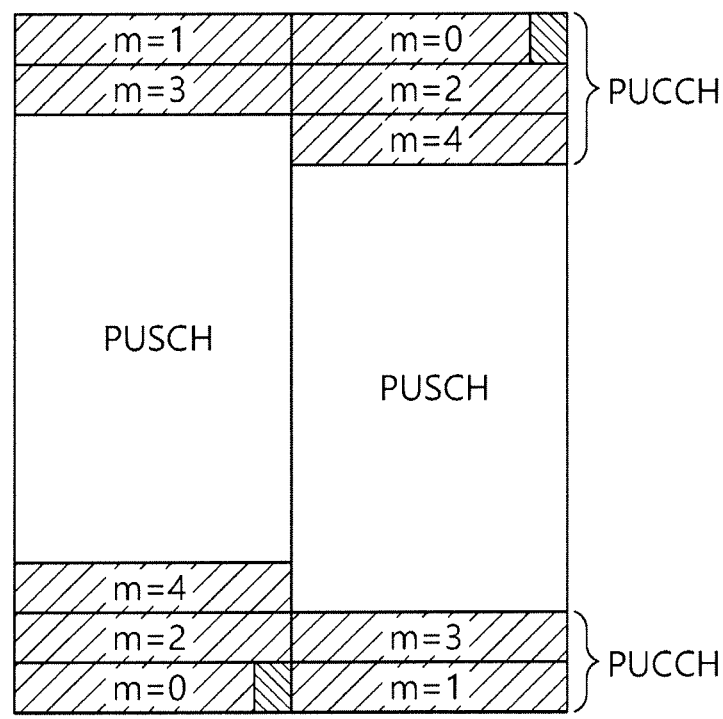
FIG. 14 illustrates an SRS transmission method depending on a C-1-th method.

FIG. 14 illustrates an SRS transmission method depending on a C-1-th method.

Referring to FIG. 13, in mode C-1, the frequency domains of the SRSs transmitted in the respective slots may be symmetric to each other based on the center with respect to the uplink bandwidth.

As one example, when the SRS is transmitted in RB index m in a first slot, the SRS is transmitted in RB index $N_{RB}^{UL}$-m in a second slot.

Mode C-2

The mode C-2 is a mode that transmits the SRS in one OFDM symbol of each slot in the region where the transmission of the second SRS is configured.

The base station may announce the OFDM symbol at the time of configuring the second SRS and the OFDM symbol may be predesignated according to a terminal RNTI. Therefore, more SRS resources may be secured.

Mode C-3

The mode C-3 is a mode that transmits the second SRS in the OFDM symbol corresponding to all or some of the DMRSs.

The mode C-3 may be applied in the case of PUCCH format 3. The reason may be that the CDM of the data region may be performed through the OCC in the case of PUCCH format 3.

Mode C-4

The mode C-4 is a mode that the base station allocates the PUCCH resource to the terminal and the terminal transmits the PUCCH according to the allocated PUCCH resource.

Herein, the PUCCH may be construed as the second SRS. The PUCCH may operate based on the uplink grant. In this case, the PUCCH resource may be included in the corresponding uplink grant.

Further, the mode may be applied differently for each PUCCH format.

In the aforementioned mode, when the aperiodic SRS is configured, it may be considered that a new format is added with respect to the DCI for triggering the corresponding SRS and it may be considered that the existing SRS field is reused or added.

When the Rel-11 SRS field is reused, triggering for the first SRS or triggering for the second SRS may be distinguished according to the subframe in which the corresponding DCI is transmitted.

Further, since the CDM with the PUCCH is considered in the case of a PUCCH based design, the DCI is transmitted after 4 subframes from the subframe in which the DCI for the triggering is transmitted without being limited to the SRS subframe.

Figure 15:
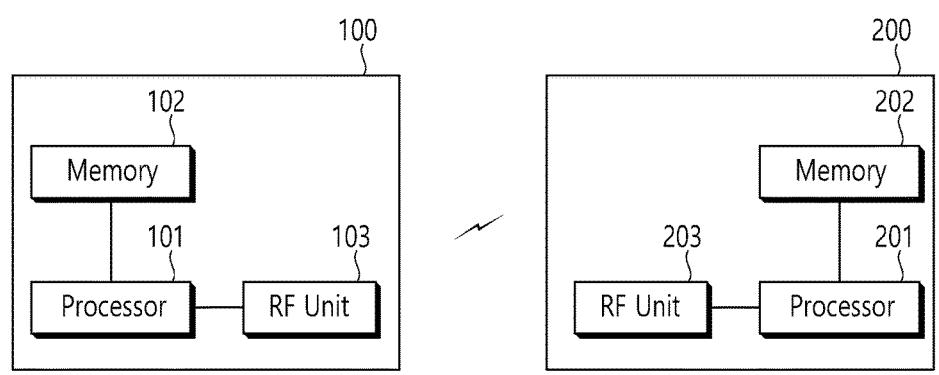
FIG. 15 is a block diagram illustrating a wireless communication system in which a disclosure of the present specification is implemented.

FIG. 15 is a block diagram illustrating a wireless communication system in which a disclosure of the present specification is implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

A terminal 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

A terminal according to one disclosure of the present specification as a terminal for transmitting a sound reference signal (SRS) in a wireless communication system may include: an RF unit receiving an SRS configuration from a base station by the terminal; and a processor controlling the RF unit to determine an SRS subframe to which the SRS is to be transmitted among a plurality of subframes and an SRS transmission region to which the SRS is to be transmitted in a physical uplink control channel (PUCCH) region on the SRS subframe, on the basis of the received SRS configuration and transmit the SRS to the SRS transmission region on the determined SRS subframe.

Further, when the SRS and a PUCCH are simultaneously transmitted to the SRS transmission region, the SRS and the PUCCH may be multiplexed on the basis of code division multiplexing (CDM).

Further, the SRS subframe may include two slots including a plurality of orthogonal frequency division multiplexing (OFDM) symbols and the SRS may be transmitted in any one OFDM symbol in each of the two slots.

Besides, the any one OFDM symbol may be designated in the SRS configuration or predesignated according to a radio network temporary identifier (RNTI) of the terminal.

Moreover, the any one OFDM symbol may be the last symbol of each of the two slots.

In addition, the SRS may be transmitted to be symmetric based on the center of the uplink bandwidth.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting a sounding reference signal (SRS) used for a physical uplink control channel (PUCCH) in a wireless communication system, the method performed by a terminal and comprising:
receiving, by the terminal, an SRS configuration from a base station;
determining an SRS subframe on which the SRS is to be transmitted among a plurality of subframes and an SRS transmission region on which the SRS is to be transmitted on the SRS subframe, based on the received SRS configuration, wherein the SRS is transmitted in each slot on the SRS subframe, and SRSs in the each slot on the same SRS subframe are transmitted symmetrically in the frequency domain; and transmitting the SRS used for measuring channel quality of the PUCCH in the SRS transmission region on the SRS subframe, wherein when the SRS and the PUCCH are simultaneously transmitted, the SRS is distinguished from the PUCCH by multiplexing with the PUCCH based on code division multiplexing (CDM).

2. The method of claim 1, wherein the CDM for the multiplexing includes an orthogonal cover code (OCC).

3. The method of claim 1, wherein the SRS subframe includes two slots including a plurality of orthogonal frequency division multiplexing (OFDM) symbols, and wherein the SRS is transmitted in the last OFDM symbol of each of the two slots.

4. The method of claim 1, wherein the SRS subframe includes two slots including a plurality of orthogonal frequency division multiplexing (OFDM) symbols, and wherein the SRS is transmitted in any one OFDM symbol of each of the two slots.

5. The method of claim 4, wherein the any one OFDM symbol is designated in the SRS configuration or predesignated according to a radio network temporary identifier (RNTI) of the terminal.

6. The method of claim 1, wherein the SRS subframe includes two slots including a plurality of orthogonal frequency division multiplexing (OFDM) symbols, and wherein the SRS is transmitted in OFDM symbols corresponding to all or some of demodulation reference signals (DMRSs) among the plurality of OFDM symbols.

7. The method of claim 6, wherein the SRS is transmitted based on a PUCCH format 3 standardized by a $3^{rd}$ Generation Partnership Project (3GPP).

8. The method of claim 1, wherein the SRS is transmitted onto a PUCCH resource allocated based on a UL grant.

9. A terminal for transmitting a sounding reference signal (SRS) used for a physical uplink control channel (PUCCH) in a wireless communication system, the terminal comprising:

a transceiver; and a processor configured to:
control the transceiver to receive an SRS configuration from a base station,
determine an SRS subframe on which the SRS is to be transmitted among a plurality of subframes and an SRS transmission region on which the SRS is to be transmitted on the SRS subframe, based on the received SRS configuration,
wherein the SRS is transmitted in each slot on the SRS subframe, and SRSs in the each slot on the same SRS subframe are transmitted symmetrically in the frequency domain, and
control the transceiver to transmit the SRS used for measuring channel quality of the PUCCH in the SRS transmission region on the SRS subframe,
wherein when the SRS and the PUCCH are simultaneously, the SRS is distinguished from the PUCCH by multiplexing with the PUCCH based on code division multiplexing (CDM).

10. The terminal of claim 9, wherein the SRS subframe includes two slots including a plurality of orthogonal frequency division multiplexing (OFDM) symbols, and wherein the SRS is transmitted in any one OFDM symbol of each of the two slots.

11. The terminal of claim 10, wherein the any one OFDM symbol is designated in the SRS configuration or predesignated according to a radio network temporary identifier (RNTI) of the terminal.

12. The terminal of claim 10, wherein the any one OFDM symbol is the last symbol of each of the two slots.

* * * * *